United States Patent
Hui et al.

(10) Patent No.: US 11,247,769 B2
(45) Date of Patent: Feb. 15, 2022

(54) AERODYNAMIC STRUCTURE FOR AIRCRAFT WING

(71) Applicant: AIRBUS OPERATIONS LIMITED, Bristol (GB)

(72) Inventors: Ching-Yu Hui, Bristol (GB); Neil John Lyons, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 155 days.

(21) Appl. No.: 16/672,951

(22) Filed: Nov. 4, 2019

(65) Prior Publication Data
US 2020/0140065 A1 May 7, 2020

(30) Foreign Application Priority Data
Nov. 5, 2018 (GB) ..................................... 1818012

(51) Int. Cl.
| | | |
|---|---|---|
| B64C 21/02 | (2006.01) | |
| B64C 3/28 | (2006.01) | |
| B64C 5/08 | (2006.01) | |
| B64C 7/00 | (2006.01) | |

(52) U.S. Cl.
CPC ................ B64C 21/02 (2013.01); B64C 3/28 (2013.01); B64C 5/08 (2013.01); B64C 7/00 (2013.01)

(58) Field of Classification Search
CPC ........... B64C 21/00; B64C 21/02; B64C 3/28; B64C 5/08; B64C 9/14; B64C 2900/143; B64C 9/22; B64C 9/24; B64C 9/26
See application file for complete search history.

(56) References Cited

U.S. PATENT DOCUMENTS

| | | |
|---|---|---|
| 3,941,334 A | 3/1976 | Cole |
| 5,253,828 A | 10/1993 | Cox |
| 6,152,404 A * | 11/2000 | Flaig ......................... B64C 9/24 244/199.1 |
| 10,618,625 B2 * | 4/2020 | Leopold .................... B64C 9/26 |
| 2017/0137116 A1 | 5/2017 | Ireland et al. |

FOREIGN PATENT DOCUMENTS

WO  2008/017134  2/2008

OTHER PUBLICATIONS

Combined Search and Examination Report for GB Application No. 1818012.5 dated May 2, 2019, 7 pages.

* cited by examiner

*Primary Examiner* — Philip J Bonzell
*Assistant Examiner* — Ashesh Dangol
(74) *Attorney, Agent, or Firm* — Nixon & Vanderhye P.C.

(57) ABSTRACT

An aerodynamic structure for use on an upper surface of an aircraft wing is disclosed. The wing includes a slat operable between a stowed configuration in which the slat is stowed in a slat recess of the wing, and a deployed configuration in which the slat extends out of the slat recess. When the slat is in the deployed configuration, an end face of the slat recess is exposed, the end face intersecting with the upper surface of the wing at a recess edge. The aerodynamic structure, adjacent to the recess edge, has a volume shaped to encourage air flowing over the recess edge onto the upper surface during flight, to remain attached.

13 Claims, 7 Drawing Sheets

AERODYNAMIC STRUCTURE FOR AIRCRAFT WING

CROSS RELATED APPLICATION

This application claims priority to United Kingdom (GB) Patent Application 1818012.5, filed Nov. 5, 2018, the entire contents of which are hereby incorporated by reference.

BACKGROUND OF THE INVENTION

The present invention concerns aircraft wings. More particularly, but not exclusively, the invention concerns the provision of aerodynamic structures for use on aircraft wings.

Aircraft wings may comprise discontinuities, e.g. sharp corners, in some wing regions, which may affect airflow around the wing, and consequently the performance of the aircraft during flight. Such discontinuities may be found, for example, as part of a slat recess, or cavity, for housing a leading-edge slat. A leading-edge slat is an aerodynamic surface on the leading edge of a wing which, when deployed, allows the wing to operate at a higher angle of attack. The slat may be stowed in the slat recess during cruise, and may be deployed to extend out of the slat recess during take-off and/or landing. With the slat stowed in, and flush with, the slat recess, the upper surface of the slat may be substantially continuous with the upper surface of the wing, thereby concealing the inner faces of the slat recess. However, with the slat deployed, the inner faces of the slat recess may be exposed. The inner faces of the slat recess, e.g. especially the two opposing end faces, may form sharp edges with the adjacent upper surface of the wing.

During flight and with the slat deployed, air may flow from the slat recess onto the upper surface of the wing. However, separation of the airflow may occur as the airflow is forced over sharp edges. For example, cross-flow from the vicinity of an end face of the slat recess may detach from the wing as it is forced over the edge between the end face and the wing upper surface. Such local flow separation can degrade the downstream boundary layer, e.g. by reducing the energy of the downstream boundary layer, which in turn renders the downstream boundary layer more susceptible to other causes of flow separation, e.g. adverse pressure gradients or surface imperfections. The local flow separation occurring adjacent to discontinuities on the wing planform can limit or reduce the maximum lift coefficient of the wing, and consequently of the aircraft as a whole, thereby affecting the performance of the aircraft.

The present invention seeks to mitigate one or more of the above-mentioned problems. Alternatively or additionally, the present invention seeks to provide an improved aircraft and aircraft wing.

SUMMARY OF THE INVENTION

According to a first aspect, there is provided a wing for an aircraft, the wing comprising a fixed-wing structure having a slat recess, and a leading-edge slat. The slat is operable between a stowed configuration in which the slat is stowed in the slat recess, and a deployed configuration in which the slat is extended out of the slat recess. When the slat is in the deployed configuration, an end face of the slat recess is exposed, the end face of the slat recess intersecting with an upper surface of the wing along a recess edge. The upper surface of the wing comprises an aerodynamic structure adjacent to the recess edge. The aerodynamic structure has a volume shaped to encourage air flowing over the recess edge onto the upper surface during flight, to remain attached.

By providing an aerodynamic structure adjacent to the recess edge which is shaped to encourage attachment of airflow onto the upper surface, local flow separation may be reduced compared to a case in which such an aerodynamic structure is not present at the recess edge. By reducing flow separation due to the recess edge, the energy of the downstream boundary layer on the wing upper surface may be increased, such that the boundary layer is more able to sustain other causes of flow separation. Further, by reducing local flow separation at the recess edge and improving the downstream boundary layer, stall may be delayed and the maximum lift coefficient of the wing may be increased.

The aerodynamic structure may be shaped to blunt, smooth, or round, the recess edge which may otherwise be undesirably sharp. The aerodynamic structure may be curved. For example, the volume of the aerodynamic structure may have a curved cross-sectional profile. The curved cross-sectional profile may be taken in a cross section intersecting the recess edge, and more preferably in a cross section intersecting the recess edge at approximately 90 degrees. The aerodynamic structure may be shaped to increase a radius of curvature of the recess edge. The presence and/or shape of the aerodynamic structure creates a rounded edge in place of a sharp edge. Blunting the recess edge facilitates the attachment of airflow onto the wing upper surface as it traverses the edge.

The aerodynamic structure is comprised in the wing upper surface. As such, the aerodynamic structure is arranged to be exposed to airflow when the slat is in the stowed configuration. For example, the aerodynamic structure may be mounted onto an initial, existing upper surface, thereby forming a new upper surface, or the aerodynamic structure may be integrally formed with the wing structure itself. By arranging the aerodynamic structure on the wing upper surface, the clearance between relatively-moving components, e.g. between the slat and the slat recess, tends to be unaffected. This may enable the aerodynamic structure to be used without substantive changes to the slat and/or slat recess and may enable the structure to be readily used in a retro-fit scenario. Alternatively or additionally, any clearance may be less affected than if such an aerodynamic structure were positioned differently, e.g. on the end face of the slat recess or on the slat itself. Therefore less modification of existing aircraft structure and/or kinematics is required to incorporate the aerodynamic structure of the present invention than may be required in such comparative cases.

The aerodynamic structure may be elongate. A longitudinal axis of the structure may be substantially aligned with the recess edge and/or with a characteristic chord of the wing. As such, an amount of drag incurred due to the presence of the structure on the wing during cruise flight may be minimised.

The aerodynamic structure may have a curvature, in the longitudinal direction, configured to complement the curvature of the wing. The aerodynamic structure may be shaped to cause and/or augment vortex generation. Vortex augmentation may be achieved by tailoring the forward extent of the aerodynamic structure and/or the longitudinal profile of the aerodynamic structure. The aerodynamic structure may extend towards, and preferably below, the wing leading edge. Extending the structure around or below the wing leading edge may cause and/or augment vortex generation at the leading end of the structure during flight, further delaying local flow separation on the wing upper surface. The aerodynamic structure may extend away from the wing leading edge along the upper surface of the wing towards a trailing end of the aerodynamic structure. The volume of the structure may have a longitudinal profile that tapers to a point at the trailing end, thereby reducing an amount of drag incurred by the structure and reducing the likelihood of flow separation caused by the structure itself.

The inboard end of the slat recess may be located at a wing root leading edge. The wing may comprise a wing root fairing for blending the wing to a fuselage at the wing root. The wing root fairing may comprise the recess edge. As such, local flow separation occurring at a junction between the wing root fairing and an inboard end of a slat recess may be reduced.

According to a second aspect, there is provided an aerodynamic structure for use on a wing according to the first aspect.

The aerodynamic structure may comprise an attachment interface configured to attach the aerodynamic structure to the wing. As such, the aerodynamic structure may be retrofittable onto an existing wing to improve the aerodynamic and/or flight properties of the wing.

The volume of the aerodynamic structure may have a curved cross-sectional profile. The cross-sectional profile may be asymmetrical. The cross-sectional profile may be globular at a first lateral end of the aerodynamic structure and taper to a point at a second lateral end of the aerodynamic structure, the first lateral end to be positioned proximally to the recess edge and the second lateral end to be positioned distally to the recess edge. The volume of the structure may have a thickness of between 30 and 40 millimetres (mm). As such, the aerodynamic structure may have a curvature to effectively encourage air flowing around the recess edge to remain attached to the wing upper surface, whilst minimising an amount of drag caused by including the structure on the wing upper surface, external to the wing cruise envelope.

According to a third aspect, there is provided an aircraft comprising a wing according to the first aspect and/or an aerodynamic structure according to the second aspect.

According to a fourth aspect, there is provided a method. The method comprises providing a wing for an aircraft, the wing comprising a fixed wing structure having a slat recess, and a leading edge slat, the slat being operable between a stowed configuration in which the slat is stowed in the slat recess, and a deployed configuration in which the slat is extended out of the slat recess, wherein when the slat is in the deployed configuration, an end face of the slat recess is exposed, the end face of the slat recess intersecting with an upper surface of the wing along a recess edge. The method further comprises mounting an aerodynamic structure on the upper surface of the wing adjacent to the recess edge, the aerodynamic structure having a volume shaped to encourage air flowing over the recess edge onto the upper surface during flight, to remain attached.

Preferably, the aerodynamic structure is arranged to be exposed to airflow when the slat is in the stowed configuration. By mounting the aerodynamic structure on the upper surface of the wing, an existing aircraft and/or aircraft wing may be retro-fitted with the aerodynamic structure, enabling a reduction in local flow separation in the vicinity of wing planform discontinuities whilst reducing an extent and/or complexity of aircraft modification required compared to some other retro-fitting methods. Further, retro-fitting the aerodynamic structure onto an existing wing may be less costly, use less material and/or be less time-consuming than constructing a new wing incorporating the aerodynamic structure.

According to a fifth aspect, there is provided an aerodynamic device mountable on an upper surface of an aircraft wing, the wing comprising a leading-edge slat operable between a stowed configuration in which the slat is stowed in a slat recess of the wing, and a deployed configuration in which the slat is extended out of the slat recess, wherein when the slat is in the deployed configuration, an end face of the slat recess is exposed, the end face of the slat recess intersecting with the upper surface of the wing along a recess edge. The aerodynamic device comprises a base, and a volume defining a cross-sectional profile of the device, wherein the cross-sectional profile is globular at a first end of the device and tapers to a point at a second end of the device, the second end being opposite the first end. The first end is to be positioned proximally to the recess edge and the second end is to be positioned distally to the recess edge such that, with the base mounted on the upper surface of the wing and adjacent to the recess edge, the volume is operable to encourage air flowing over the recess edge onto the upper surface during flight, to remain attached. The aerodynamic device may be arranged to be exposed to airflow when the slat is in the stowed configuration.

According to a sixth aspect, there is provided a wing for an aircraft, the wing comprising the aerodynamic device according to the fifth aspect.

According to a seventh aspect, there is provided an aircraft comprising the aerodynamic device according to the fifth aspect.

According to another aspect, there is provided an aircraft comprising a wing and a fuselage, the wing extending from the fuselage at a wing root, and the wing comprising a wing root fairing for blending a leading edge of the wing into the fuselage at the wing root. The wing comprises a slat recess in the leading edge of the wing for housing a deployable slat, the slat recess having a rearward face recessed from the leading edge of the wing, and inboard and outboard end faces of the recess extending between the rearward face and the wing leading edge at inboard and outboard ends of the slat recess respectively. The aircraft comprises a bulbous aerodynamic device located at the junction between the inboard end face and the wing root fairing, the curvature of the device being configured to encourage attachment of air flowing onto the wing root fairing from the slat recess, when the slat is deployed. Preferably, the device is arranged to be exposed to airflow when the slat is stowed.

According to yet another aspect, there is provided a wing for an aircraft, the wing comprising a fixed-wing structure having a discontinuity. The upper surface of the wing comprises an aerodynamic structure adjacent to the discontinuity. The aerodynamic structure has a volume shaped to encourage air flowing over the discontinuity onto the upper surface during flight, to remain attached.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
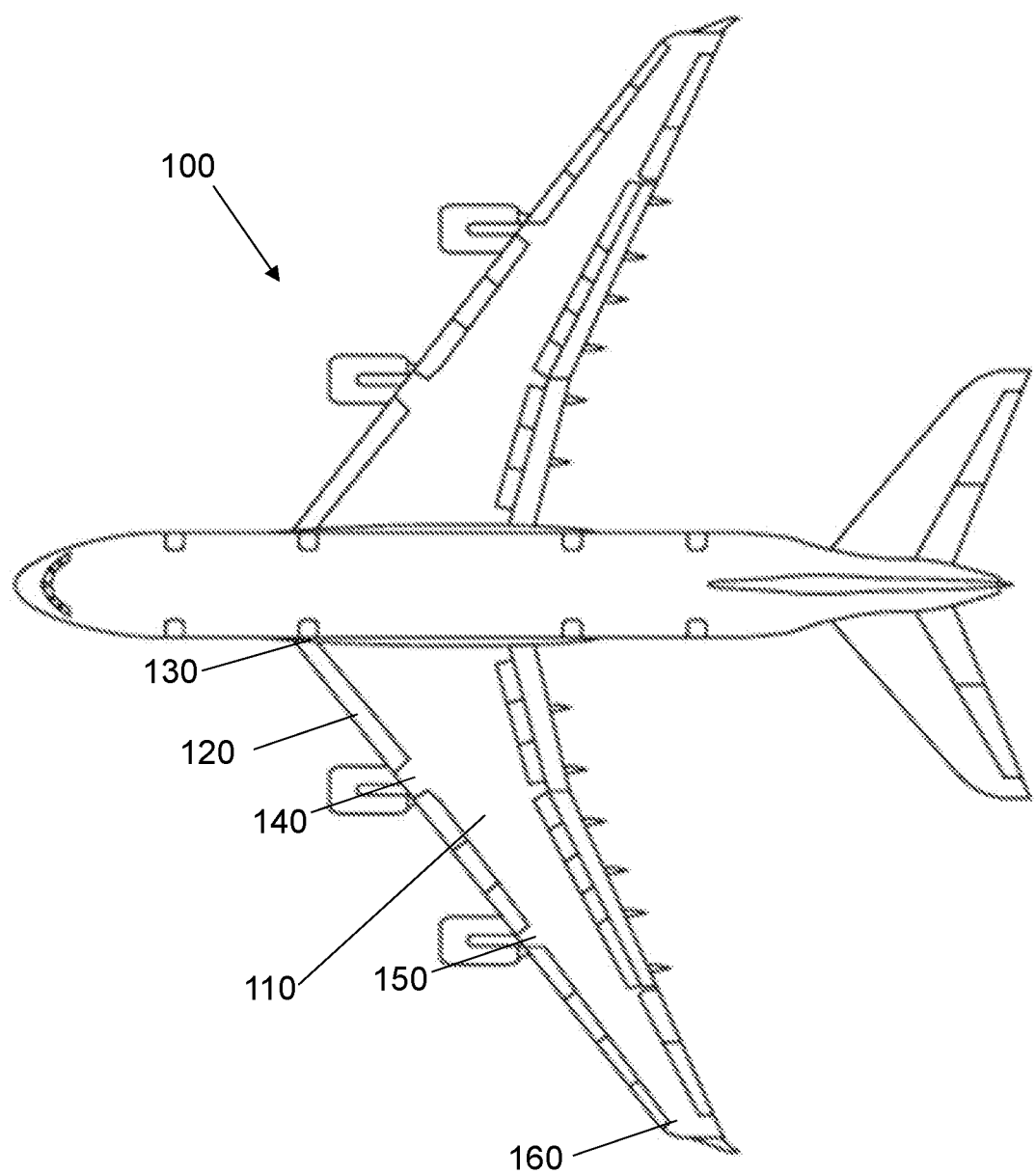
FIG. 1A shows a plan view of a known aircraft.

FIG. 1, provided for context, shows a plan view of an known aircraft 100. The aircraft 100 is an example of an aircraft to which the presently described invention may be applied, as will be described in more detail below. The aircraft 100 may be a fixed-wing aircraft. The aircraft 100 comprises a wing 110. Whilst the wing 110 shown in FIG. 1 is a swept wing, the methods and apparatuses described herein may also be applied to unswept wings. The wing 110 comprises a leading-edge slat 120 arranged at the leading edge of the wing 110. The slat 120 extends in a spanwise direction from a root region 130 of the wing 110 to a first wing pylon junction region 140. The root region may comprise a fairing, e.g. an onglet. An onglet is a structure for blending the wing to the fuselage at the wing root. For example, the onglet may blend the leading edge of the wing into the fuselage at the wing root. The onglet may comprise a fillet fairing. In this example, the slat 120 is one of a plurality of slats comprised in the wing 110. The plurality of slats includes one or more slats extending from the first wing pylon junction region 140 to a second wing pylon junction region 150, and one or more slats extending from the second wing pylon junction region 150 to a wing tip region 160. Different numbers and/or arrangements of slats than those shown in FIG. 1 may be used in other examples.

Each of the slats comprised in the wing 110 may be housed in a slat recess. A slat recess may be considered a cut-out, cavity or housing in the fixed-wing structure, shaped to house one or more slats. A given slat recess may be comprised in a leading edge of the wing 110. In some examples, each slat is housed in a respective slat recess. In other examples, multiple adjacent slats may be housed in a single slat recess.

The slat 120 is operable in a stowed configuration, in which the slat 120 is stowed in a corresponding slat recess. The stowed configuration may be used, for example, during a cruise flight phase of the aircraft 100, in order to minimise drag. The slat 120 is also operable in a deployed configuration, in which the slat 120 is extended out of the slat recess. The deployed configuration may be used during take-off and/or landing of the aircraft 100, and/or when the aircraft 100 performs a manoeuvre which takes the aircraft 100 close to a stall. When in the deployed configuration, the slat 120 allows the wing 110 to operate at a higher angle of attack, enabling a higher coefficient of lift to be achieved.

Figure 1B:
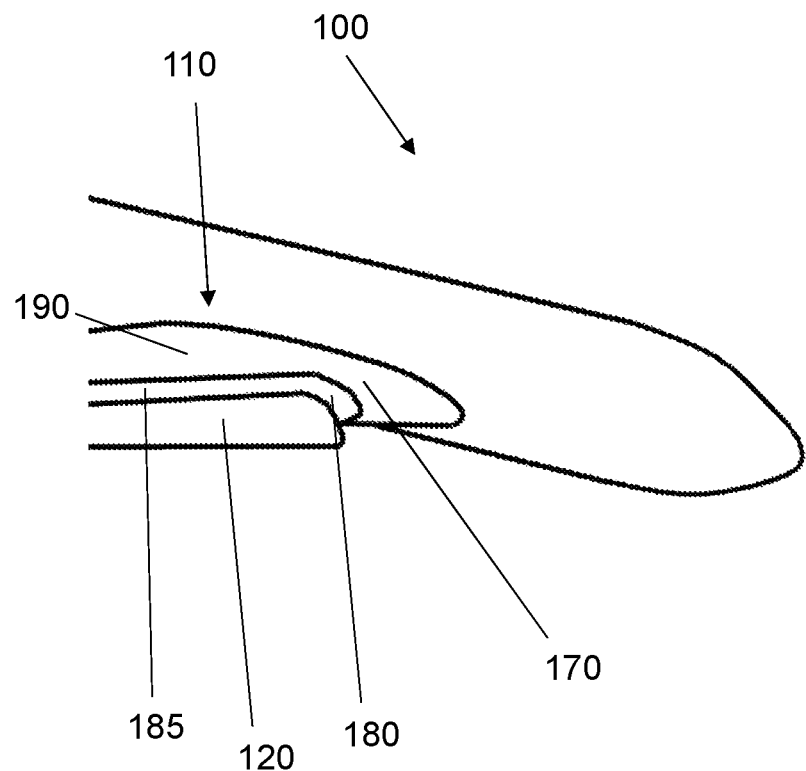
FIG. 1B shows a diagonal perspective view of part of the known aircraft shown in FIG. 1A.

FIG. 1B shows a diagonal perspective view of a part of the known aircraft 100 shown in FIG. 1A. Elements common to figures have the same reference numerals in the accompanying figures.

In FIG. 1B, the slat 120 is in the deployed configuration. That is, the slat 120 is extending out of a slat recess configured to house the slat 120. The slat recess extends spanwise from the wing root region 170 to a wing pylon junction region (not shown). With the slat 120 in the deployed configuration, a portion of the slat recess is exposed. In particular, a number of faces of the slat recess, which would be hidden and not exposed to airflow were the slat 120 in the stowed configuration, are exposed to airflow with the slat 120 in the deployed configuration. The exposed faces may include one or more end faces 180 and a rear face 185. The one or more end faces may comprise an inboard end face and an outboard end face. The inboard and outboard end faces 180 extend between the rear face 185 and the wing leading edge at inboard and outboard ends of the slat recess respectively. As such, each end face extends between the rear face 185 and the wing leading edge. An end face may have a normal substantially parallel to a spanwise direction of the wing 110, within acceptable manufacturing tolerances. An end face may be considered a longitudinal face, relative to a cruise direction. An end face is an inner face of the slat recess which, with the slat 120 in the stowed configuration, faces a side end of the slat 120. The rear face 185, or rearward face, may have a normal substantially parallel to a chordwise direction, within acceptable manufacturing tolerances. A rear face may be considered a transverse face, relative to the cruise direction. A rear face is an inner face of the slat recess which, with the slat 120 in the stowed configuration, faces a rear side of the slat 120. A rear face is recessed from the leading edge of the wing 110. The exposed faces of the slat recess may be substantially vertical when the aircraft is orientated horizontally. Each of the exposed faces of the recess forms an edge with the upper surface 190 of the wing 110. With the slat 120 in the stowed configuration, the inner faces of the slat recess are not exposed and the upper surface of the slat 120 is approximately continuous with the upper surface 190 of the wing. When the slat 120 is deployed, however, the previously smooth interface between the slat upper surface and the upper surface 190 of the wing is broken, thereby exposing the edges between the inner faces 180, 185 of the slat recess and the wing upper surface 190. Such recess edges are an example of a wing planform discontinuity. As described above, such recess edges may encourage the local detachment of airflow during flight.

Figure 2:
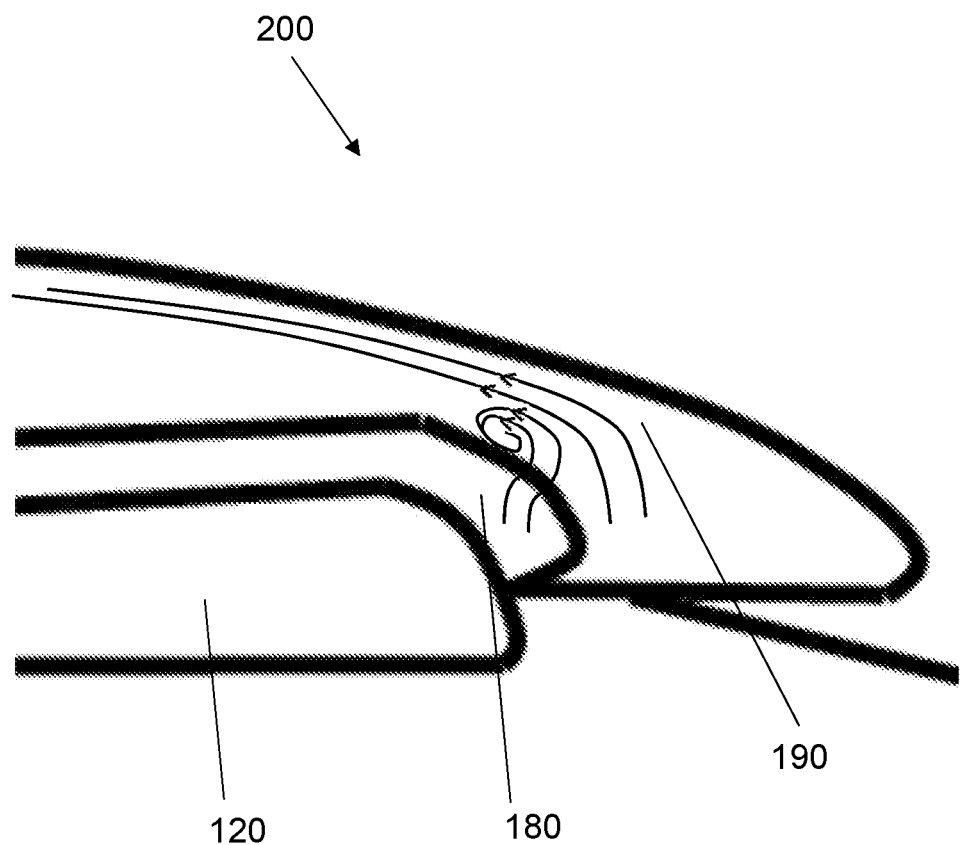
FIG. 2 shows a representation of a simulation of airflow relative to a part of the known aircraft shown in FIGS. 1A and 1B.

FIG. 2 shows a representation 200 of a result of a computational simulation of air flowing over a part of the known aircraft 100. The streamlines of the local air flow are shown with arrowed lines.

As shown in FIG. 2, a recess edge is formed between the wing upper surface 190 and an inner face 180 of a slat recess in the wing root region when the slat 120 is deployed. An undesirable separation of the airflow occurs on the wing upper surface 190 as the air traverses the recess edge, from the slat recess. Such local flow separation can degrade the downstream boundary layer, as discussed above.

One way of reducing flow separation arising from an exposed recess edge is to incorporate an aerodynamic structure on the inner face of the slat recess, e.g. an end face. Such a structure may alter the effective geometry of the recess edge so as to encourage air flowing from the recess to remain attached to the wing. However, incorporating such a structure into the wing may involve altering the structure of the slat recess and/or of the slat, in order to be able to accommodate, when the slat is stowed, the additional volume between the end face of the recess and the slat itself. Such structural alterations may be relatively complex, particularly when the aerodynamic structure is to be retro-fitted onto an existing wing. Further, including such a structure may undesirably affect the clearance between components, namely the slat and the fixed leading edge of the wing, thereby altering the preconfigured kinematics of the aircraft.

Figure 3A:
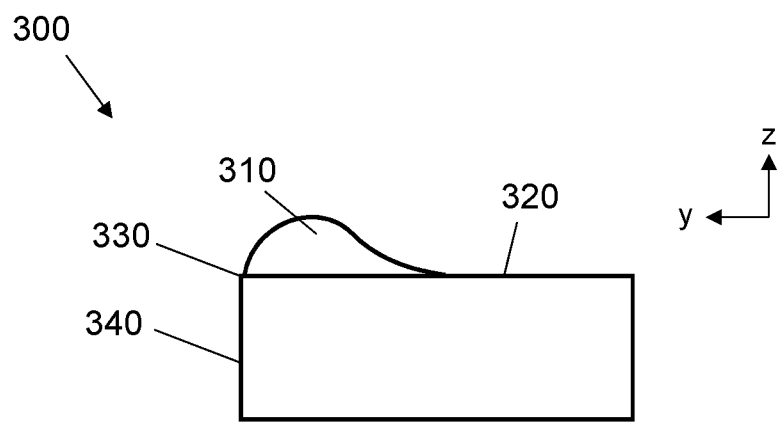
FIG. 3A shows a cross-sectional view of an aerodynamic structure applied to a wing, according to a first embodiment.
Figure 3B:
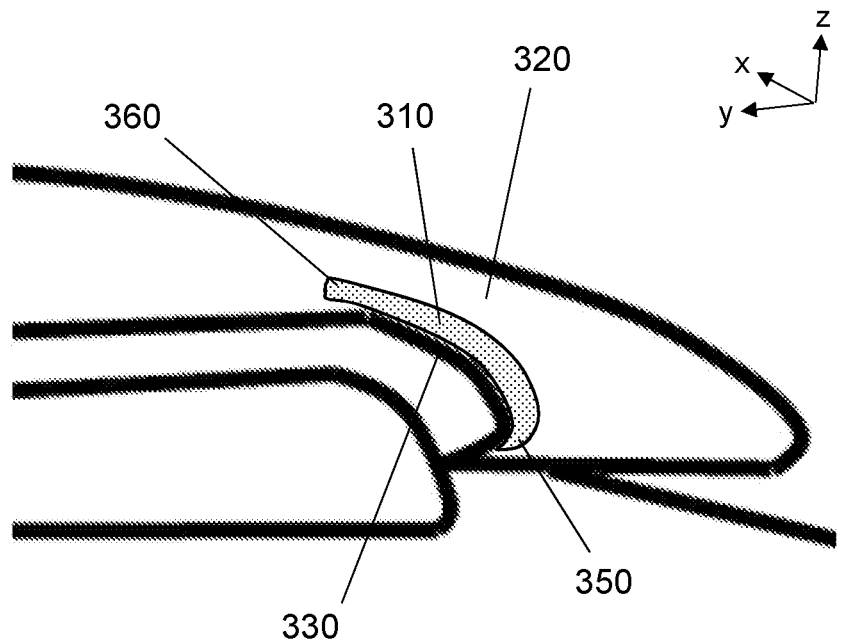
FIG. 3B shows a diagonal perspective view of the aerodynamic structure shown in FIG. 3A.
Figure 4:
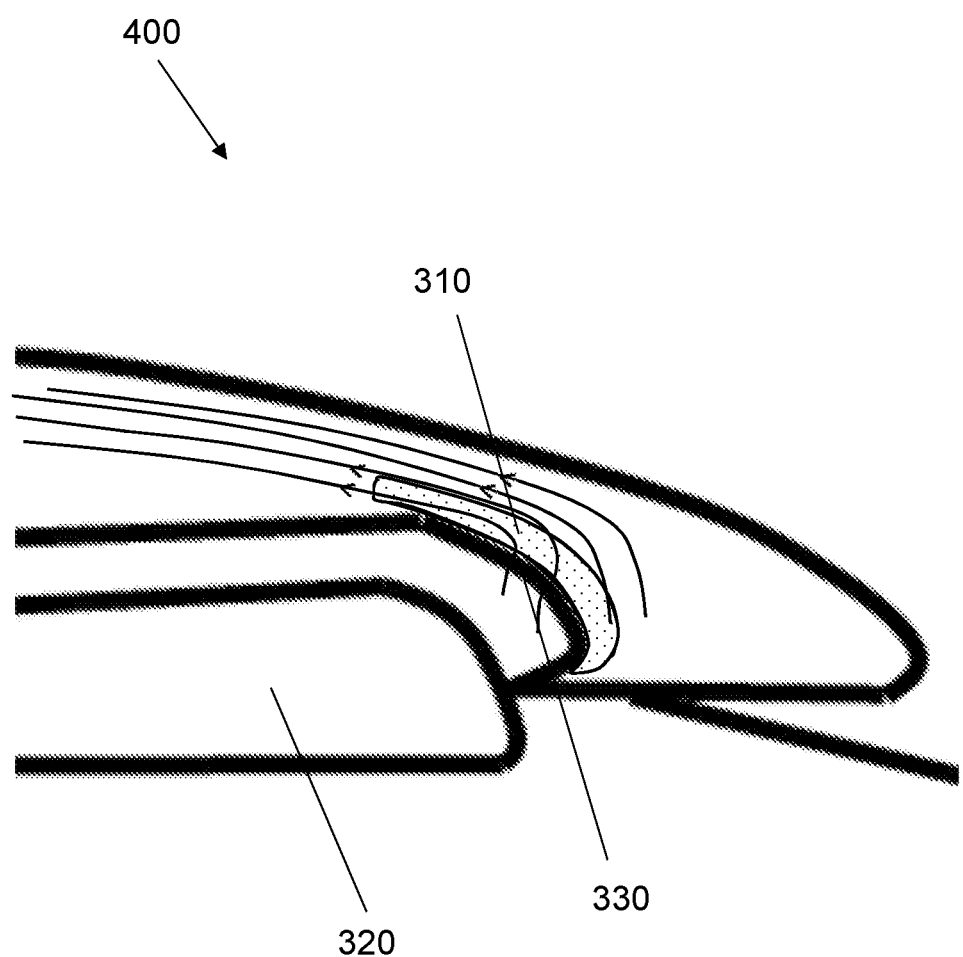
FIG. 4 shows a representation of a simulation of airflow relative to the aerodynamic structure shown in FIGS. 3A and 3B.

With reference to FIGS. 3A, 3B and 4, a first embodiment of the invention seeks to mitigate the above mentioned problems. FIG. 3A shows a cross-sectional view of an aerodynamic structure 310 applied to a wing 300, according to the first embodiment. The aerodynamic structure 310 may be applied to, fitted on, mounted on, retro-fitted on, used with, and/or integrated into, any suitable aircraft wing, for example the wing 110 described above.

The aerodynamic structure 310 is arranged on the upper surface 320 of the wing. That is, the aerodynamic structure 310 is arranged to be exposed to airflow when the slat is in the stowed configuration. As such, the structure 310 is external to a wing cruise envelope, in that the structure 310 is exposed to airflow during a cruise phase of flight. In other words, the structure 310 is exposed to airflow regardless of whether a slat is in the stowed configuration or the deployed configuration. The uppermost surface of the structure 310 may thus form part of the wing upper surface 320 when the structure 310 is applied to the wing. As such, the wing upper surface 320 comprises the structure 310 in this embodiment. In some examples, the structure 310 and the wing are integrally formed.

In the first embodiment, the upper surface of the wing is at a wing root region. For example, the upper surface of the wing may be formed by a wing root fairing. As such, the structure 310 is arranged in the vicinity of a wing root, it being understood that the structure 310 may be arranged on other regions of the wing upper surface in other embodiments.

The aerodynamic structure 310 is arranged adjacent to the recess edge 330. As such, in the first embodiment, the structure 310 is arranged adjacent to an end face 340 of the slat recess. The structure 310 may abut the recess edge 330, e.g. be in direct contact with the recess edge 330, or may be separated from the recess edge 330 but still be in relatively close proximity to the recess edge 330. The aerodynamic structure 310 is considered to be adjacent to the recess edge 330 in both of the above cases.

The aerodynamic structure 310 provides the wing upper surface 320 with additional volume and height in the vicinity of the recess edge 330. The structure 310 may be considered to be a wing upper surface protrusion or protuberance. The structure 310 may be bulbous and/or globular. The volume of the structure 310 is shaped to encourage air flowing over the recess edge 330, e.g. from the recess, onto the wing upper surface 320, to remain attached. The structure 310 may be shaped to blunt the recess edge 330, and/or to provide a relatively blunt edge in place of a relatively sharp edge.

The cross-sectional view shown in FIG. 3A depicts the cross-sectional profile of the structure 310. The cross-sectional profile corresponds to a slice of the structure 310 perpendicular to the direction along which the recess edge 330 extends. In examples where the structure 310 is elongate, the cross-sectional profile corresponds to a slice of the structure 310 perpendicular to the longitudinal or major axis of the structure. The aerodynamic structure may not be elongate in other examples.

In this embodiment, the cross-sectional profile of the structure 310 is curved. An aerodynamic structure with a curved cross-sectional profile may further reduce a likelihood of flow separation on the wing upper surface 320 adjacent to the recess edge 330 compared to an aerodynamic structure without a curved cross-sectional profile. A curved structure may be more aerodynamic than a non-curved structure, for example. The cross-sectional profile may not be curved in other examples. For example, the shape of the cross-sectional profile may approximate a trapezium or another straight-edged shape.

In this embodiment, the cross-sectional profile is asymmetrical. As such, the height of the structure 310 has a maximum value at a lateral position in the cross-sectional profile that is off-centre. Lateral positions may be defined with reference to the y-axis depicted in FIG. 3A. In this case, the height of the structure 310 has a maximum value closer to a first lateral end of the structure 310 than to a second lateral end of the structure 310, where the first lateral end is positioned proximally to the recess edge 330 and the second lateral end is positioned distally to the recess edge 330. The cross-sectional profile is globular at the first lateral end and tapers to a point at the second lateral end, in the first embodiment. As such, the cross-sectional profile of the structure 310 may be considered to be teardrop-shaped. A teardrop-shaped cross-section may provide an optimal structure for aerodynamically facilitating the attachment of airflow onto the wing upper surface 320, whilst reducing a penalty in cruise drag caused by the presence of the structure. In this embodiment, the structure 310 has a curvature configured to complement a leading edge of the wing. The cross-sectional profile of the structure may have other shapes and/or characteristics in other examples. In some cases, the first lateral end is positioned distally to the recess edge 330 and the second lateral end is positioned proximally to the recess edge 330. In some cases, the cross-sectional profile is symmetrical. For example, the cross-sectional profile may be approximately semi-circular in shape.

In this embodiment, the volume of the structure 310 has a predetermined thickness configured to reduce an amount of drag incurred by the structure 310 during flight whilst sufficiently reducing local detachment of airflow in the vicinity of the recess edge 330. The thickness of the volume may be a maximum distance from the base of the structure 310 to the outer, or upper, surface of the structure 310. The thickness of the volume may be considered as the maximum height of the structure 310, e.g. along the z-axis as depicted in FIG. 3A. Where the structure 310 is integrated into the wing, the thickness of the volume may be considered to be the maximum elevation of the outer surface of the structure 310 relative to the recess edge 330. The thickness, or height, of the structure 310 may vary across the cross-sectional profile of the structure 310 and/or may vary across the longitudinal profile of the structure 310, as discussed in more detail below. The volume of the structure 310 may have a thickness below 100 millimetres (mm), e.g. for a large passenger aircraft. The thickness of the structure 310 may be scaled or adjusted with aircraft size. The volume of the structure 310 may have a thickness of between 30 and 40 mm. In an example, the volume of the structure 310 has a thickness of approximately 35 mm. As such, the addition of the structure 310 onto the wing upper surface 320 may increase the effective height of the wing upper surface 320 in the vicinity of the recess edge 330 by approximately 35 mm. Other thicknesses may be used in other examples.

The structure 310 may be formed from any suitable material including, but not limited to, metals, metal alloys, plastics and composites such as carbon fibre and fibre glass materials.

In examples where the structure 310 is to be mounted, e.g. retro-fitted, to an existing aircraft wing, the structure 310 comprises an attachment interface for attaching the structure to the upper surface 320 of the wing. As such, the structure 310 may be attached externally to the wing. Attaching the structure externally to the upper surface of the wing reduces an impact on the underlying wing structure, and thus reduces a complexity and/or expense associated with modifying the aircraft, compared to a case in which the structure is not added externally.

FIG. 3B shows a diagonal perspective view of the structure 310 applied to an upper surface of a wing according to the first embodiment. In this embodiment, the upper surface of the wing is at a wing root region. The wing root region comprises part of the wing leading edge. The wing root region may comprise a wing root fairing, e.g. an onglet. The wing root fairing may comprise part of the wing leading edge. The wing root region is in the vicinity of an end of a slat recess in this embodiment. For example, the upper surface of the wing root region may intersect with an inboard end face (not shown) of the slat recess, at the recess edge 330. The structure 310 is thus located at a junction between an inboard end face of the recess and the wing root upper surface in the first embodiment. In examples where the wing root region comprises a wing root fairing, the structure 310 is located at a junction between the inboard end face of the recess and the wing root fairing.

In this embodiment, the structure 310 is elongate, thereby defining a longitudinal or major axis of the structure 310 parallel to the longest dimension of the structure 310. The longitudinal axis of the structure 310 is substantially aligned with the recess edge 330. As such, the structure is adjacent to the recess edge 330 and extends substantially parallel to the recess edge 330, e.g. within acceptable manufacturing tolerances. The longitudinal axis of the structure 310 may be substantially aligned with a characteristic chord of the wing. Examples of characteristic chords include, but are not limited to, a standard mean chord, a mean aerodynamic chord, a root chord, and a tip chord. During a cruise flight phase, airflow over the wing upper surface 320 may be approximately aligned with the characteristic chord of the wing. As such, the longest dimension of the structure 310 may be approximately aligned with the direction of airflow during the cruise flight phase. This may reduce an amount of drag incurred due to the presence of the structure 310, compared to a case in which the longest dimension of the structure is not aligned with the direction of airflow during the cruise flight phase.

The structure 310 has a leading end 350 and a trailing end 360. The leading end 350 and the trailing end 360 are longitudinal ends of the structure 310, as opposed to the lateral ends depicted in the cross-sectional view of FIG. 3A.

The structure 310 has a curvature configured to complement a leading edge of the wing, in the first embodiment. The leading end 350 of the structure 310 may be shaped and/or arranged to cause or augment vortex generation. In this example, the structure 310 extends below the wing leading edge. As such, the leading end 350 of the structure 310 is positioned at or beyond the leading edge point of the wing. In other words, the structure 310 starts below the wing leading edge point, extends around the leading edge and onto the upper surface 320 of the wing. A structure which passes around or below the leading edge point of the wing may be more aerodynamic than a structure which does not pass around or below the leading edge point of the wing. For example, a structure which extends around the leading edge point of the wing may, during flight, generate a vortex element at the leading end 350 of the structure. Such a vortex element may act to remove a part of the boundary layer in contact with the wing, thereby further delaying flow separation locally and/or downstream on the wing upper surface 320. In other examples, the structure 310 is arranged on the upper surface 320 of the wing but does not pass around or below the leading edge point of the wing. A structure that does not pass around or below the leading edge point of the wing may require substantially less modification to the wing structure than a structure which does pass around or below the leading edge point of the wing.

In this example, the structure 310 extends away from the wing leading edge along the upper surface 320 of the wing towards the trailing end 360 of the structure 310. The trailing end 360 of the structure 310 is arranged on the wing upper surface 320. In this example, the structure 310 has a longitudinal profile that tapers to a point at the trailing end 360 of the structure 310. The longitudinal profile corresponds to a slice of the structure 310 parallel to the longitudinal or major axis of the structure. The longitudinal profile may correspond to a slice of the structure 310 parallel to a chordwise direction and/or to the direction along which the recess edge 330 extends. Providing a longitudinal profile which tapers to a point at the trailing end 360 of the structure 310 may result in a more aerodynamic structure than a case in which the longitudinal profile does not taper to a point. Such a longitudinal profile may reduce drag and/or encourage downstream airflow to remain attached to the wing upper surface 320.

FIG. 4 shows a representation 400 of a result of a computational simulation of air flowing over a part of an aircraft to which the aerodynamic structure 310 of the first embodiment has been applied. The streamlines of local air flow are shown with arrowed lines.

As shown in FIG. 4, the addition of the aerodynamic structure 310 reduces airflow separation on the wing upper surface 320 in the vicinity of the recess edge 330 compared to the comparative case shown in FIG. 2. Instead, the air flowing over the recess edge 330 remains attached to the wing upper surface 320. By reducing local flow separation, the downstream boundary layer may be energised, as discussed above.

Figure 5:
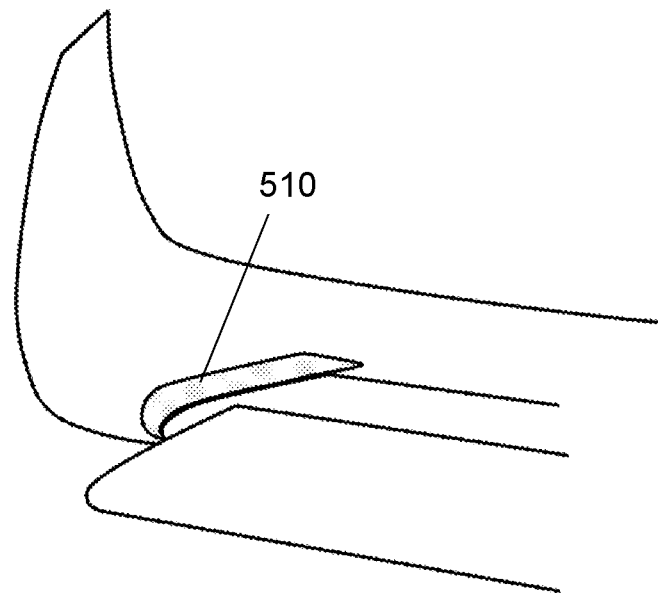
FIG. 5 shows a diagonal perspective view of an aerodynamic structure applied to a wing, according to a second embodiment.

FIG. 5 shows a diagonal perspective view of an aerodynamic structure 510 applied to an upper surface of a wing, according to a second embodiment.

In this embodiment, the structure 510 is on the upper surface of the wing adjacent to a junction between an outboard end of a slat and a wing tip region. The wing tip region may include a winglet. The junction forms an exposed recess edge when the slat is deployed. The junction is an example of a wing discontinuity. The structure 510 is arranged to encourage air flowing over the recess edge onto the wing upper surface to remain attached.

Figure 6:
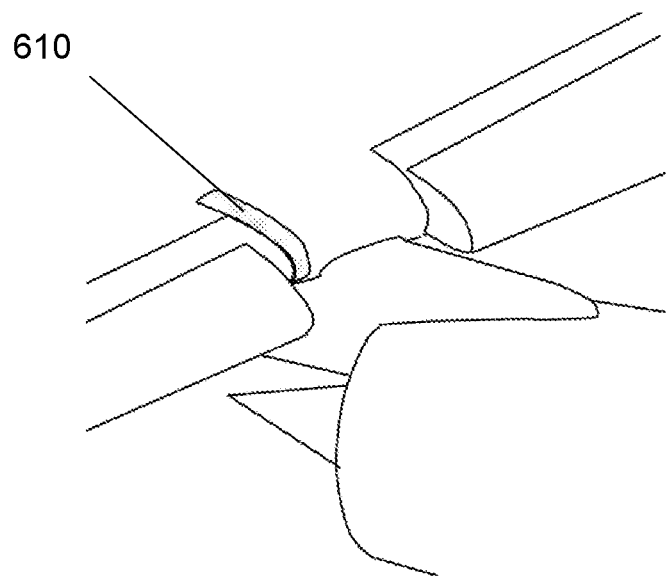
FIG. 6 shows a diagonal perspective view of an aerodynamic structure applied to a wing, according to a third embodiment.

FIG. 6 shows a diagonal perspective view of an aerodynamic structure 610 applied to an upper surface of a wing, according to a third embodiment.

In this embodiment, the structure 610 is on the upper surface of the wing at a wing pylon region. The pylon region may include a pylon, or station, at which an engine is mounted to the wing. The structure 610 is at a junction between an inboard end of a slat and the wing pylon region.

In some cases, the structure 610 is at a junction between an outboard end of a slat and the wing pylon region. The junction forms an exposed recess edge when the slat is deployed. The junction is an example of a wing discontinuity. The structure 610 is arranged to encourage air flowing over the recess edge onto the wing upper surface to remain attached.

Figure 7:
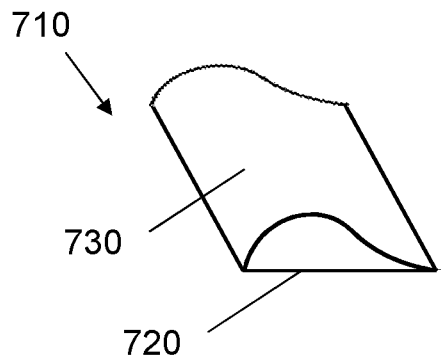
FIG. 7 shows a diagonal perspective view of an aerodynamic structure according to a fourth embodiment.

FIG. 7 shows a diagonal perspective view of an aerodynamic device 710 according to a fourth embodiment.

The aerodynamic device 710 is mountable on an upper surface of an aircraft wing, such as the wing 110 described with reference to FIGS. 1A and 1B.

The aerodynamic device 710 comprises a base 720 and a volume 730. In this embodiment, the base 720 comprises an attachment interface for attaching the device to the upper surface of a wing, adjacent to a recess edge. In this embodiment, the base 720 is shaped to complement the curvature (or lack thereof) of the wing upper surface. The volume 730 defines a cross-sectional profile of the device. In this embodiment, the cross-sectional profile is globular at a first end of the device and tapers to a point at a second end of the device, the second end being opposite the first end. The device 710 may be mounted onto the upper surface of the wing at various locations on the wing, e.g. at a wing root region, a wing pylon region, and/or a wing tip region. The volume 730 is configured to encourage air flowing over a recess edge onto the upper surface of the wing during flight, to remain attached.

Figure 8:
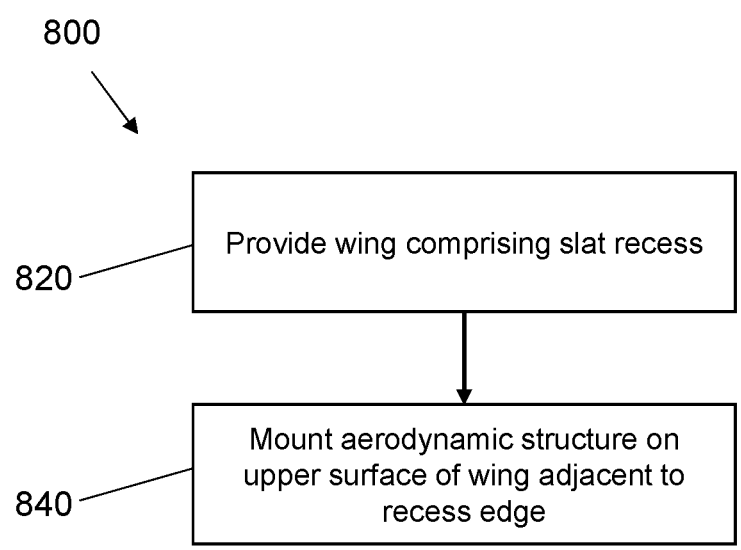
FIG. 8 shows a flow chart depicting a method according to a fifth embodiment.

FIG. 8 shows a method 800 according to an example. The method 800 may be considered a method of retro-fitting an aerodynamic structure to an existing aircraft. The method 800 may be used to retro-fit a structure such as the aerodynamic structures 310, 510, 610, 710 described above to an existing aircraft.

At item 820, a wing for an aircraft is provided. The wing comprises a fixed wing structure having a slat recess. The wing further comprises a leading-edge slat, the slat being operable between a stowed configuration in which the slat is stowed in the slat recess, and a deployed configuration in which the slat is extended out of the slat recess. When the slat is in the deployed configuration, an end face of the slat recess is exposed, the end face of the slat recess intersecting with an upper surface of the wing along a recess edge.

At item 840, an aerodynamic structure is mounted on the upper surface of the wing adjacent to the recess edge. The aerodynamic structure may comprise an attachment interface for attaching the aerodynamic structure to the upper surface of the wing. The aerodynamic structure may have a planar base, and/or a base shaped to complement the curvature (or lack thereof) of the wing upper surface. The aerodynamic structure may be mounted to the outside of the upper surface of the wing. Mounting the aerodynamic structure may comprise mounting the base onto the upper surface of the wing and securing the structure in place, e.g. through the use of plate nuts, anchor nuts or any other suitable attachment means. The aerodynamic structure may be mounted onto the wing in multiple sections or as a single unit.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

An aerodynamic structure such as the structure 310 described above may be applied to the upper surface of a wing adjacent to a structural discontinuity other than a slat recess edge. Such discontinuities in the wing and/or wing planform may arise due to the presence of wing features including, but not limited to, flaps, cuffs, dog-tooth extensions, root extensions, cut-outs and slots. In some cases, the aerodynamic structure is applied adjacent to structural discontinuities at the wing leading edge. In other cases, the aerodynamic structure may be applied adjacent to structural discontinuities at the wing trailing edge. An aerodynamic structure, or device, may facilitate the attachment of air flowing over such structural discontinuities onto the wing upper surface, thereby energising the downstream boundary layer and improving wing lift.

In some cases, multiple aerodynamic devices may be arranged along a single recess edge or other wing discontinuity. In other cases, a single aerodynamic device is arranged to extend along all or part of the discontinuity.

The aerodynamic structures described herein may be used in combination with other types of aerodynamic device on an aircraft. For example, in addition to the described aerodynamic structure, an aircraft may comprise one or more of: slat horns, nacelle strakes, fuselage strakes, leading edge fences, vortillons, leading-edge vortex generators, root Krueger flaps, pylon Krueger flaps, leading-edge droops, pylon-wing lower surface junction fairings and slat ramps.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. A wing for an aircraft, the wing comprising:
a fixed-wing structure having a slat recess; and
a leading-edge slat, the slat being operable between a stowed configuration in which the slat is stowed in the slat recess, and a deployed configuration in which the slat is extended out of the slat recess,
wherein when the slat is in the deployed configuration, an end face of the slat recess is exposed, the end face of the slat recess extending between a rear face of the slat recess and the leading edge of the wing, the end face of the slat recess intersecting with an upper surface of the wing along a recess edge,
wherein the upper surface of the wing comprises an aerodynamic structure adjacent to the recess edge, the aerodynamic structure being arranged to be exposed to airflow when the slat is in the stowed configuration, the aerodynamic structure having a volume shaped to encourage air flowing over the recess edge onto the upper surface during flight, to remain attached, wherein the volume of the aerodynamic structure has a curved cross-sectional profile taken in a cross section oriented perpendicular to the direction along which the recess edge extends, and wherein the cross-sectional profile is asymmetrical.

2. A wing according to claim 1,
wherein the aerodynamic structure is elongate, and
wherein a longitudinal axis of the aerodynamic structure is substantially aligned with the recess edge and/or with a characteristic chord of the wing.

3. A wing according to claim 1,
wherein the wing comprises a wing leading edge, and
wherein the aerodynamic structure has a curvature configured to complement the wing leading edge.

4. A wing according to claim 3, wherein the aerodynamic structure extends below the wing leading edge.

5. A wing according to claim 3,
wherein the aerodynamic structure extends away from the wing leading edge along the upper surface of the wing towards a trailing end of the aerodynamic structure, and
wherein the volume has a longitudinal profile that tapers to a point at the trailing end.

6. A wing according to claim 1, the wing comprising a wing root fairing for blending the wing to a fuselage, wherein the wing root fairing comprises the recess edge.

7. An aerodynamic structure for use on a wing according to claim 1.

8. An aerodynamic structure according to claim 7, the aerodynamic structure comprising an attachment interface configured to attach the aerodynamic structure to the wing.

9. An aerodynamic structure according to claim 1, wherein the cross-sectional profile is globular at a first lateral end of the aerodynamic structure and tapers to a point at a second lateral end of the aerodynamic structure, the first lateral end to be positioned proximally to the recess edge and the second lateral end to be positioned distally to the recess edge.

10. An aerodynamic structure according to claim 7, wherein the volume has a thickness of between 30 and 40 mm.

11. A method comprising:
providing a wing for an aircraft, the wing comprising:
a fixed wing structure having a slat recess; and
a leading edge slat, the slat being operable between a stowed configuration in which the slat is stowed in the slat recess, and a deployed configuration in which the slat is extended out of the slat recess, wherein when the slat is in the deployed configuration, an end face of the slat recess is exposed, the end face of the slat recess extending between a rear face of the slat recess and the leading edge of the wing, the end face of the slat recess intersecting with an upper surface of the wing along a recess edge;
mounting an aerodynamic structure on the upper surface of the wing adjacent to the recess edge, the aerodynamic structure being arranged to be exposed to airflow when the slat is in the stowed configuration, the aerodynamic structure having a volume shaped to encourage air flowing over the recess edge onto the upper surface during flight, to remain attached,
wherein the volume of the aerodynamic structure has a curved cross-sectional profile taken in a cross section oriented perpendicular to the direction along which the recess edge extends, and
wherein the cross-sectional profile is asymmetrical.

12. An aerodynamic device system comprising an aerodynamic device and an aircraft wing, wherein the aerodynamic device is mountable on an upper surface of the aircraft wing, the aircraft wing comprising a leading-edge slat operable between a stowed configuration in which the slat is stowed in a slat recess of the wing, and a deployed configuration in which the slat is extended out of the slat recess, wherein when the slat is in the deployed configuration, an end face of the slat recess is exposed, the end face of the slat recess extending between a rear face of the slat recess and the leading edge of the wing, the end face of the slat recess intersecting with the upper surface of the wing along a recess edge, the aerodynamic device comprising:
a base; and
a volume defining a cross-sectional profile of the device taken in a cross section oriented perpendicular to the direction along which the recess edge extends, wherein the cross-sectional profile is curved and asymmetrical,
wherein the cross-sectional profile is globular at a first end of the device and tapers to a point at a second end of the device, the second end being opposite the first end,
wherein the first end is to be positioned proximally to the recess edge and the second end is to be positioned distally to the recess edge such that, with the base mounted on the upper surface of the wing and adjacent to the recess edge, the volume is operable to encourage air flowing over the recess edge onto the upper surface during flight, to remain attached.

13. An aircraft comprising a wing and a fuselage, the wing extending from the fuselage at a wing root, and the wing comprising a wing root fairing for blending a leading edge of the wing into the fuselage at the wing root,
wherein the wing comprises a slat recess in the leading edge of the wing for housing a deployable slat, the slat recess having a rearward face recessed from the leading edge of the wing, and inboard and outboard end faces of the recess extending between the rearward face and the wing leading edge at inboard and outboard ends of the slat recess respectively,
wherein the aircraft comprises a bulbous aerodynamic device located at the junction between the inboard end face and the wing root fairing, the device being arranged to be exposed to airflow when the slat is stowed, the curvature of the device being configured to encourage attachment of air flowing onto the wing root fairing from the slat recess, when the slat is deployed,
wherein the volume of the aerodynamic structure has a curved cross-sectional profile taken in a cross section oriented perpendicular to the direction along which the recess edge extends, and
wherein the cross-sectional profile is asymmetrical.

* * * * *